US008613055B1

(12) United States Patent
Tomilson et al.

(10) Patent No.: US 8,613,055 B1
(45) Date of Patent: Dec. 17, 2013

(54) METHODS AND APPARATUS FOR SELECTING AN AUTHENTICATION MODE AT TIME OF ISSUANCE OF AN ACCESS TOKEN

(71) Applicant: Ping Identity Corporation, Denver, CO (US)

(72) Inventors: Scott Tomilson, Vancouver (CA); Brian Campbell, Denver, CO (US)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 13/774,653

(22) Filed: Feb. 22, 2013

(51) Int. Cl.
G06F 21/00 (2013.01)

(52) U.S. Cl.
USPC ............ 726/4; 726/9; 726/20; 713/182

(58) Field of Classification Search
None
See application file for complete search history.

(56) References Cited

U.S. PATENT DOCUMENTS

| 7,500,262 | B1 | 3/2009 | Sanin et al. |
| 8,473,749 | B1 | 6/2013 | Madsen et al. |
| 2003/0200202 | A1 | 10/2003 | Hsiao et al. |
| 2005/0240763 | A9 | 10/2005 | Bhat et al. |
| 2006/0070114 | A1* | 3/2006 | Wood et al. ............... 726/2 |
| 2008/0148351 | A1* | 6/2008 | Bhatia et al. ............... 726/2 |
| 2008/0170693 | A1* | 7/2008 | Spies et al. ............... 380/277 |
| 2009/0113527 | A1 | 4/2009 | Naaman et al. |
| 2009/0133031 | A1* | 5/2009 | Inoue ............... 718/105 |
| 2009/0187975 | A1* | 7/2009 | Edwards et al. ............... 726/4 |
| 2011/0265173 | A1 | 10/2011 | Naaman et al. |
| 2011/0321131 | A1 | 12/2011 | Austel et al. |
| 2012/0017001 | A1* | 1/2012 | Braddy et al. ............... 709/229 |
| 2012/0110646 | A1 | 5/2012 | Ajitomi et al. |
| 2012/0117626 | A1 | 5/2012 | Yates et al. |
| 2012/0144202 | A1* | 6/2012 | Counterman ............... 713/176 |
| 2012/0291114 | A1* | 11/2012 | Poliashenko et al. ............... 726/8 |
| 2013/0055362 | A1* | 2/2013 | Rathbun ............... 726/5 |
| 2013/0086679 | A1 | 4/2013 | Beiter |

OTHER PUBLICATIONS

"Migrating tokens to system accounts," Twitter Developers, Nov. 7, 2011, Retrieved from the Internet: <URL: http://www.dev.twitter.com/docs/ios/migrating-tokens-core-accounts/> (3 pages).

(Continued)

*Primary Examiner* — Fikremariam A Yalew
*Assistant Examiner* — Kendall Dolly
(74) *Attorney, Agent, or Firm* — Cooley LLP

(57) ABSTRACT

In some embodiments, an apparatus includes an authorization module implemented in at least one of a memory or a processing device. The authorization module can receive from an application a request for an access token associated with the application that includes a scope identifier associated with a level of access to a resource module. The authorization module can select based on the scope identifier at least one authentication mode from a set of predefined authentication modes. The authorization module can also receive at least one credential assigned to at least one authentication mode. Additionally, the authorization module can send the access token to the application in response to authenticating a user of the application based on the at least one credential.

20 Claims, 3 Drawing Sheets

(56) References Cited

OTHER PUBLICATIONS

"API requests with TWRequest" Twitter Developers, Jan. 5, 2012, Retrieved from the Internet: <URL: http://www.dev.twitter.com/docs/ios/making-api-requests-twrequest> (3 page).

Ryan Whitwam, "How Android Smartly Manages Your Accounts and Logins," Tested News, Jun. 8, 2011, Retrieved from the Internet: <URL: http://www..tested.com/news/feature/2437-how-android-smartly-manages-your-accounts-and-logins/> (4 pages).

"iOS Twitter framework," Twitter Developers, Dec. 5, 2011, Retrieved from the Internet: <URL: http://dev.twitter.com/docs/ios> (3 pages).

"AccountManager," Android Developers, Retrieved from the Internet: <URL: http://developer.android.com/reference/android/accounts/AccountManager.html>, Jan. 18, 2012 (11 pages).

"PackageManager, " Android Developers, Retrieved from the Internet: <URL: http://developer.android.com/reference/android/content/pm/PackageManager.html>, Jul. 9, 2012 (41 pages).

"Authenticating to OAuth2 Services", Android Developers, Retrieved from the internet: http://developer.android.com/training/id-auth/authenticate.html, Jan. 2, 2013.

"Google Play Services", Android Developers, Retrieved from the Internet: https://developer.android.com/google/play-services/index.html, Jan. 2, 2013.

"Partner Programs Allow Mobile Application Developers to Easily Integrate with Active Directory Authentication and Deliver 'Zero Sign-On' to Enterprise Users", Oct. 18, 2012.

G. Fletcher, et al. "Oauth Use Cases draft-ietf-oauth-use-cases-00", May 23, 2012, pp. 1-23.

Office Action mailed Oct. 2, 2012 for U.S. Appl. No. 13/544,565, filed Jul. 9, 2012.

Office Action mailed Oct. 9, 2012 for U.S. Appl. No. 13/544,553, filed Jul. 9, 2012.

"Using OAuth 2.0 to Access Google APIs," Google Developers, Jun. 26, 2012, Retrieved from the Internet: <URL: https://developers.google.com/accounts/docs/OAuth2>, 6 pgs.

"Integrating OAuth with Mobile Apps," Travis Spencer—Software Engineer, Sep. 2, 2011, Retrieved from the Internet: <URL: http://travisspencer.com/blog/2011/09/integrating-oauth-with-mobile.html>, 4 pgs.

"Single Sign on Authentication," AuthenticationWorld.com, The business of Authentication, © 2006 Huntington Ventures Ltd., Retrieved from the Internet: <URL: http://www.authenticationworld.com/Single-Sign-On-Authentication/,> 2 pgs.

Final Office Action for U.S. Appl. No. 13/544,565 mailed Mar. 4, 2013.

International Search Report and Written Opinion for International Application No. PCT/US/13/49669, mailed Aug. 20, 2013.

Office Action for U.S. Appl. No. 13/737,525 mailed May 2, 2013.

\* cited by examiner

METHODS AND APPARATUS FOR SELECTING AN AUTHENTICATION MODE AT TIME OF ISSUANCE OF AN ACCESS TOKEN

BACKGROUND

Some embodiments described herein relate generally to methods and apparatus for an authorization server to authenticate a user of an application installed on a mobile communication device before issuing an access token for the application and with the appropriate scope. In particular, but not by way of limitation, some embodiments described herein relate to methods and apparatus of authenticating the user of the application based on a scope identifier provided by the application that is associated with a level of access to a resource server requested by the application. The authorization server selects the appropriate user authentication mode from multiple predefined authentication modes based on the scope identifier.

Open Authorization (OAuth) is an open standard protocol for authorization, and allows a user, such as an enterprise employee, to grant a third-party application access to information associated with that user stored at a given location (e.g., on given website), without sharing that user's account credentials (e.g., password) or the full extent of that user's data. While OAuth 2.0 defines a browser-based interaction comparable to Single Sign-On (SSO) protocols such as Security Assertion Markup Language (SAML) and OpenID, OAuth 2.0 is not an SSO protocol. Rather, OAuth 2.0 is typically used more for authorization rather than authentication.

Because OAuth 2.0 is not focused on authentication, OAuth 2.0 provides no syntax by which the specifics of how a user is authenticated can be indicated by the application requesting authorization. In some instances, however, the strength of a user authentication step can be important if the resource for which access is being sought by an application is particularly sensitive (e.g., data related to online banking, stock trade, health records, etc.). In such instances, it may be important to obtain the user's authorization for such access only after implementing a strong user authentication step.

Accordingly, a need exists for methods and apparatus for an OAuth Authorization Server to authenticate the user of an application installed on a mobile communication device before issuing an access token with the appropriate scope to the application.

SUMMARY

In some embodiments, an apparatus includes an authorization module implemented in at least one of a memory or a processing device. The authorization module can receive from an application a request for an access token associated with the application that includes a scope identifier associated with a level of access to a resource module. The authorization module can select based on the scope identifier at least one authentication mode from a set of predefined authentication modes. The authorization module can also receive at least one credential assigned to at least one authentication mode. Additionally, the authorization module can send the access token to the application in response to authenticating a user of the application based on the at least one credential.

DETAILED DESCRIPTION

In some embodiments, an apparatus includes an authorization module implemented in at least one of a memory or a processing device. The authorization module can receive from an application a request for an access token associated with the application that includes a scope identifier associated with a level of access to a resource module. The authorization module can select based on the scope identifier at least one authentication mode from a set of predefined authentication modes. The authorization module can also receive at least one credential assigned to at least one authentication mode. Additionally, the authorization module can send the access token to the application in response to authenticating a user of the application based on the at least one credential.

In some embodiments, an apparatus includes an application implemented in at least one of a memory or a processing device. The application is configured to send to an authorization module a request for an access token associated with the application. The request includes a scope identifier associated with a level of access to a resource module such that the authorization module selects at least one authentication mode from a set of predefined authentication modes based on the scope identifier. The application is configured to receive from the authorization module an access token in response to the authorization module authenticating a user of the application using at least one authentication mode. The application is configured to send the access token to the resource module such that the resource module verifies the access token.

In some embodiments, a non-transitory processor-readable medium includes code to cause a processor to receive from an application a request for an access token. The request includes a scope identifier associated with a level of access to a resource module. The code causes the processor to select based on the scope identifier at least one authentication mode from a set of predefined authentication modes. The code further causes the processor to authenticate a user of the application using at least one authentication mode and based on at least one credential associated with the user. The code further causes the processor to send the access token to the application in response to authenticating the user.

As used in this specification, the singular forms "a," "an" and "the" include plural referents unless the context clearly dictates otherwise. Thus, for example, the term "a device" is intended to mean a single device or a combination of devices.

Figure 1:
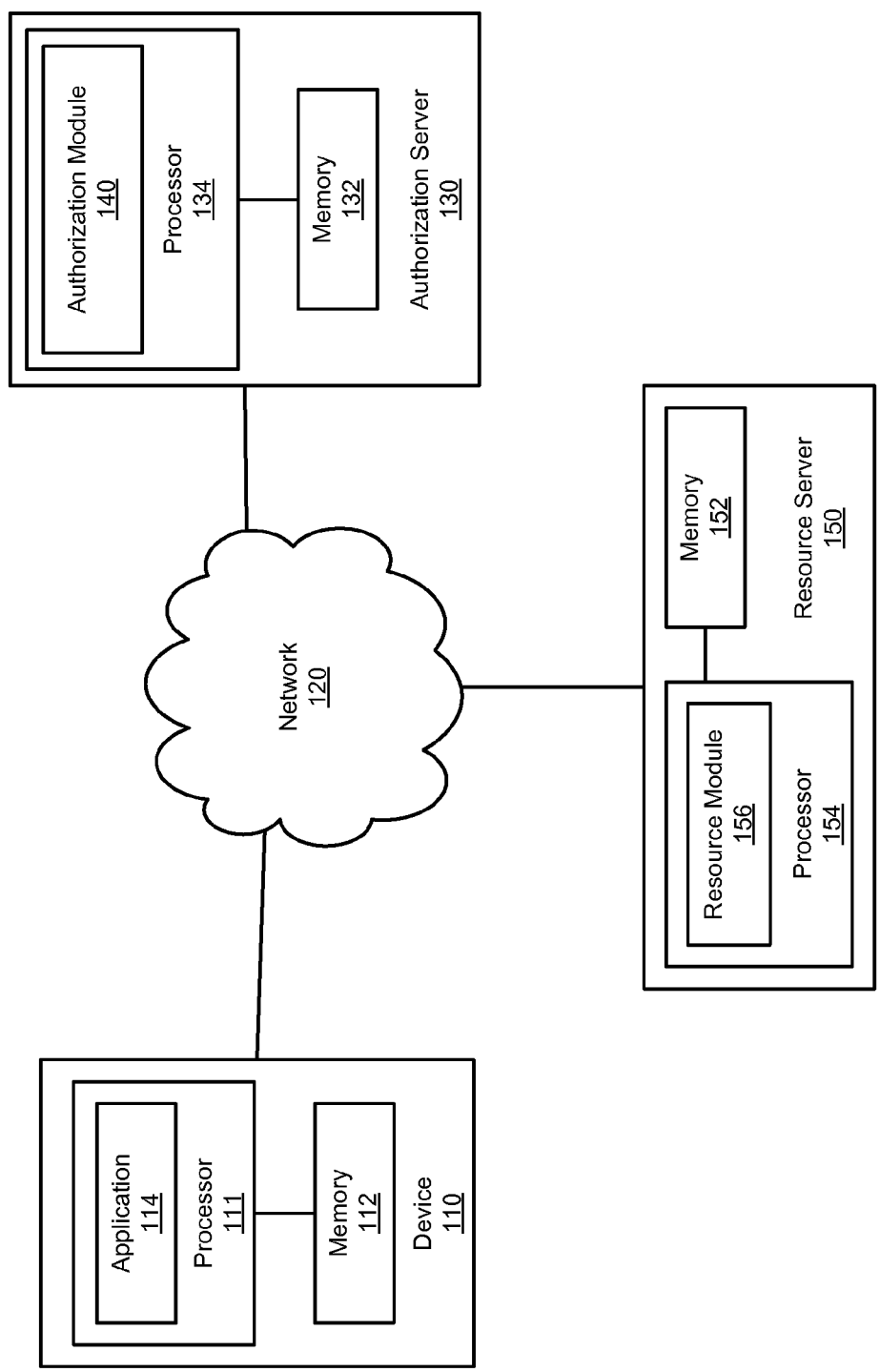
FIG. 1 is a schematic illustration of an access token issuing system, according to an embodiment.

FIG. 1 is a schematic illustration of an access token issuing system 100, according to an embodiment. The access token issuing system 100 includes a device 110, a network 120, an authorization server 130 and a resource server 150. The network 120 can be any type of network (e.g., a local area network (LAN), a wide area network (WAN), a virtual network, and/or a telecommunications network) implemented as a wired network and/or wireless network. As described in further detail herein, in some embodiments, for example, the device 110 can be connected to the authorization server 130 and the resource server 150 via an intranet, an Internet Service Provider (ISP) and the Internet, a cellular network (e.g., network 120), and/or the like.

The device 110 can be any mobile communication or computing device such as a laptop computer, a personal digital assistant (PDA), a standard mobile telephone, a tablet personal computer (PC), and/or so forth. The device 110 includes a memory 112 and a processor 111. The device 110 can be configured to generate scope identifiers associated with one or more applications (e.g., application 114), and request and receive access tokens from the authorization server 130. The device 110 can also be configured to request application data from the resource server 150 (e.g., by sending access tokens with the appropriate scope to the resource server 150) and to receive application data from the resource server 150 via the network 120 as described in further detail herein.

The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 stores instructions to cause the processor to execute modules, processes and/or functions associated with such an access token issuing system 100.

The processor 111 can be a general purpose processor, a Field Programmable Gate Array (FPGA), an Application Specific Integrated Circuit (ASIC), a Digital Signal Processor (DSP), and/or the like. The processor 111 can be configured to run and/or execute applications and/or other modules, processes and/or functions including, for example, modules, processes and functions associated with an access token issuing system 100. The processor 111 includes or can access an application 114.

The application 114 can be any native mobile application installed on the device 110 or a web-browser-based application. The application 114, for example, can be configured to receive access token(s) from the authorization module 140 with the appropriate scope and cause the processor 111 to execute specific operations associated with particular functions. For example, the application 114 can be an accounting application, a sales application, a payroll application and/or the like. In other configurations, application 114 can be any enterprise or third-party application configured to be run and/or executed at the device 110.

The application 114 can send to the authorization module 140 a signal representing a request (also referred to as a "request signal") for an access token associated with the application 114. The request signal can include a scope identifier associated with a level of access to the resource module 156 such that the authorization module 140 can select at least one authentication mode from a set of predefined authentication modes based on the scope identifier. The application 114 can receive from the authorization module 140 an access token with the appropriate scope in response to the authorization module 140 authenticating a user of the application 114 using at least one authentication mode. The application 114 can send the access token to the resource module 156 such that the resource module 156 verifies the access token and sends application data to the application 114 via the network 120.

The authorization server 130 can be, for example, a web server, an application server, a proxy server, a telnet server, a file transfer protocol (FTP) server, a mail server, a list server, a collaboration server and/or the like. The authorization server 130 can be, for example, an OAuth 2.0 authorization server. OAuth 2.0 defines a standardized messaging protocol by which an application installed on a mobile communication device can obtain security tokens such as, for example, access tokens from an authorization server. OAuth 2.0 is described in detail in "The OAuth 2.0 Authorization Framework draft-ietf-oauth-v2-31", dated Jul. 31, 2012, which is incorporated herein by reference in its entirety. These security tokens can then be included by the application 114 on its application programming interface (API) calls to a resource server, such as resource server 150, to authenticate at the resource server 150 before obtaining application data.

The authorization server 130 can receive from an application 114 a signal requesting for an access token associated with the application 114 (also referred to as a "request signal"). This request signal can include a scope identifier associated with a level of access to the resource module 156. The authorization module 140 can select based on the scope identifier at least one authentication mode from a set of predefined authentication modes. The authorization module 140 can also receive at least one credential assigned to at least one authentication mode. The credentials can include, for example, at least one of a user name, a password, an answer to a knowledge-based question, a short message service (SMS) code, a telephonic communication, an internet protocol (IP) address, or a time of day. Such credentials can either be loaded into the authorization module 140 at a pre-determined time or during each authorization event.

The authorization module 140 can authenticate a user of the application 114 using at least one authentication mode (or an authorization mode) and based on at least one credential associated with the user. The authorization module 140 can select an authentication mode by selecting an entry associated with at least one user authentication mode from, for example, an authentication mode or authorization mode database (not shown) based on the scope identifier. The credentials for a user can include, for example, a user name, a password, an answer to a knowledge-based question, a short message service (SMS) code, a telephonic communication, an internet protocol (IP) address, and/or a time of day. The authorization module 140 can define or generate an access token associated with the application 114 and send the access token with the appropriate scope to the application 114 in response to authenticating a user of the application based on at least one credential. The access token can be, for example, an Open Authorization (OAuth) access token.

The resource server 150 can, for example, be a server associated with an enterprise (such as a company) or an individual user that owns and/or controls the authorization server 130. The resource server 150 can also be or a third party server distinct from the enterprise (or individual user) that is associated with and/or controls the authorization server 130. The resource server 150 can be, for example, a Software as a Service (SaaS) host that is a web server, a proxy server, a telnet server, a file transfer protocol (FTP) server, a mail server, a list server, a collaboration server, and/or the like.

The resource server 150 includes a processor 154 and a memory 152. The memory 152 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some configurations, the memory 152 can store instructions to cause the processor 154 to execute modules (e.g., resource module 156), processes and/or functions associated with or stored on the resource server 150 within the access token issuing system 100.

The resource module 156 can be a hardware and/or software module (stored in memory 152 and/or executed in a processor 154) configured to provide application data to applications 114 via the network 120. For example, the application data can include results of external market analysis for a product of the enterprise and/or the like. This application data can be used by the application 114, for example, to set the retail price of the product, to calculate the expected profit levels for the product, to determine locations for the best retail vendors available for the product, and/or the like. In other words, the application data can be related to the type of application: sales data for a sales-related application, financial data for a financial application, etc. The resource module 156 can receive and process an access token from the application 114 of the device 110 prior to providing application data to the application 114. Such application data can enable the application 114 to execute modules, processes and/or functions associated with or stored on the device 110.

OAuth 2.0 typically includes a step in which a user of a device (e.g., an employee of an enterprise) provides consent or authorization for a given application 114 to access a given set of resources from the resource module 156. In some instances, when the user is not required to provide consent, the user will still be authenticated so that the corresponding resources for an application 114 can be determined. The rigor with which this authentication occurs can have a direct effect on the security characteristics of the resulting access token issuance and usage. Resources (and corresponding data) of high value (e.g., bank statements, credit card statements, health records, etc.), sensitivity or privacy risk warrant a stronger authentication mechanism than resources of low value (e.g., weekly fantasy football scores, personalized sports or entertainment news, etc.). Conversely, requiring a strong authentication mechanism for an authorization step for resources of low value or sensitivity can become unnecessarily burdensome for the users and potentially inappropriately expensive for the enterprise, organization, and/or an individual user.

The access token issuing system 100 allows the authorization server 130 to implement authorization methods of varying strengths for the resources for which access is being sought (e.g., via the scope identifier associated with a level of access to the resource module 156 sought by an application 114). The different authorization methods are set up according to the policies of the entity or enterprise that has tailored and/or configured the authorization server 130. The authorization server 130 can implement a strong user-authorization method for high value resources (as indicated by the scope identifier included in the request for access tokens sent by the application 114). The authorization server 130 can also implement a comparatively weaker user-authorization method for low-value resources thus improving both overall security and usability.

Figure 2:
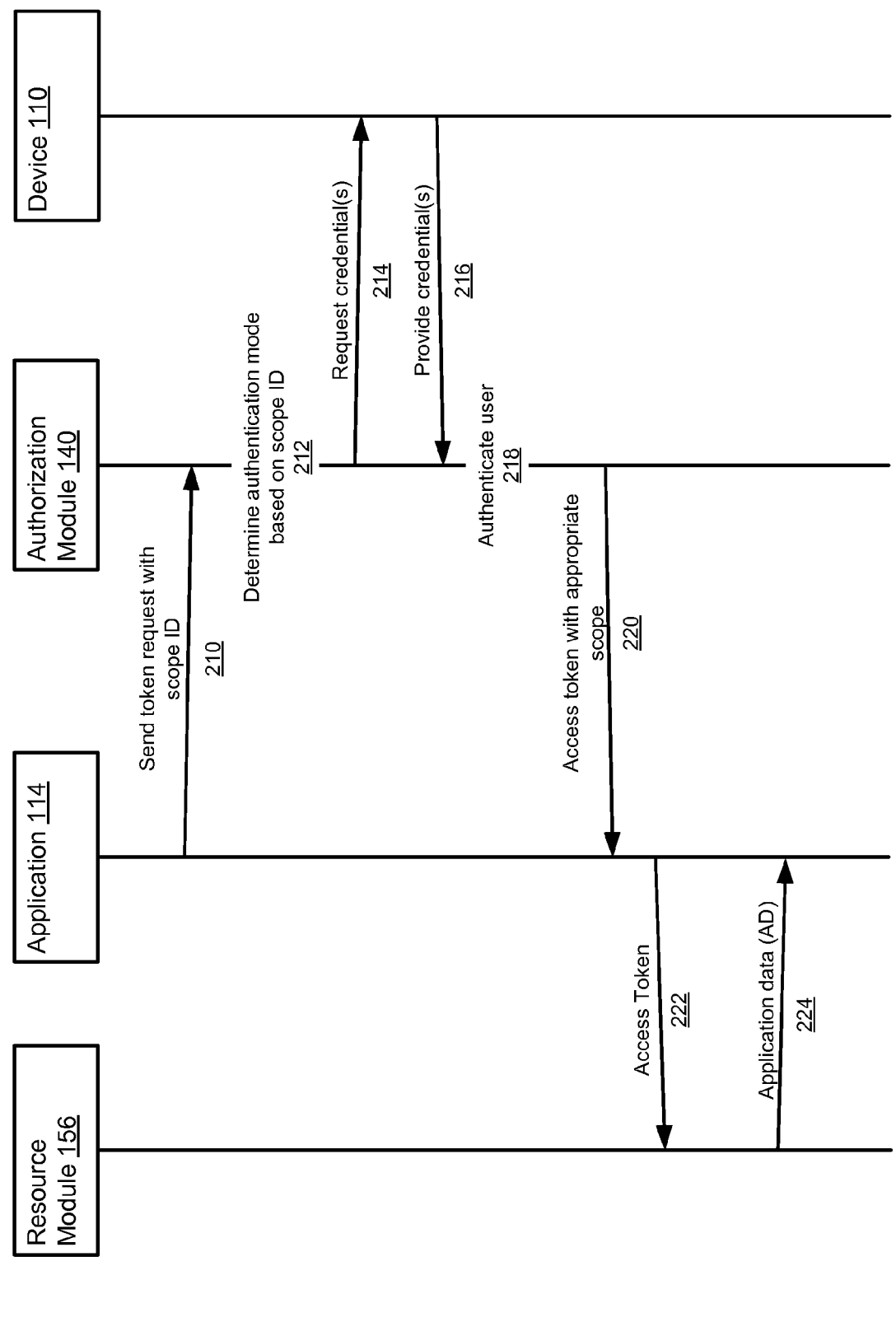
FIG. 2 is a message flow diagram illustrating a method for authenticating a user of an application and issuing the application an access token with the appropriate scope to access application data, according to an embodiment.

FIG. 2 is a message flow diagram illustrating a method 200 for authenticating a user of an application 114 and issuing the application 114 an access token with the appropriate scope to access application data, according to an embodiment. The method 200 for authenticating a user of an application 114 and issuing access tokens with the appropriate scope to an application can be performed at, for example, the access token issuing system 100 described in FIG. 1.

At 210, the application 114 sends a signal representing the scope identifier (e.g., a scope ID) and the request for the access token to the authorization module 140. The scope ID is associated with a level of access to a resource module 156. A scope is a representation of a resource(s) (or application data) that can be granted for a particular application 114, and a scope ID is a level of access to such a resource(s) (or application data). Because different resources have different sensitivities and risks associated with them, the corresponding scopes can indirectly identify the different sensitivities and risks. For example, consider the two following scopes: (i) urn:finance:stocks:list; and (ii) urn:finance:stocks:buy—the first scope refers to the application 114 being able to display a list of the stocks a given user of the device 110 owns; the second scope refers to the application 114 being able to make stock purchases on behalf of the user of the device 110. Hence, the second scope is more sensitive and thus would merit authentication of the user of the device 110 via a stronger authorization mode or method or protocol. The scope ID can be, for example, a string of arbitrary random or pseudo-random numbers generated by the application 114. The scope ID can be from a group of multiple of scope ID's that are generated by the application 114, such that each scope ID is associated with a (user) credential set different from a credential set associated with the remaining scope IDs from the group of scope IDs.

A particular scope ID can be representative of the scope of the application 114 that will be used by the user of the device 110 as described above. For example, in instances where the application 114 is a financial application that relates to the investment portfolio of a user of the device 110, a first scope ID can be used to view stocks via the application 114. This first scope ID differs from a second scope ID that can be generated by the application 114 when using the application 114 to buy or sell stocks. The first scope ID and/or the second scope ID can be added to the signal requesting the access token and is sent from the application 114 to the authorization module 140 via the network 120. To ensure that a given scope ID is used only once, in some embodiments, each scope ID can be made to be time-variant by, for example, including a suitably fine-grained timestamp in its value or each scope ID can be generated with enough random bits to ensure a probabilistically insignificant chance of repeating a previously generated value. In other embodiments, the scope IDs are not issued in secret, and the security measures described above are not implemented with the scope IDs.

At 212, the authorization module 140 determines the authentication mode (or authorization mode) based on the scope ID. The authorization module 140 determines an authentication mode such as a first authentication mode from a group (or a plurality) of authentication modes. The authorization module 140 is configured to select the first authentication mode when the scope ID is associated with a first level of access (e.g., view stocks). The authorization module 140 is configured to select the first authentication mode and a second authentication mode from the group of authentication modes when the scope ID is also associated with a second level of access (e.g., view, buy, and sell stocks).

The authorization module 140 can determine the appropriate authentication mode (or authorization mode) from a set of predefined authentication modes by selecting an entry associated with at least one authentication mode from an authentication mode or authorization mode database (not shown in FIG. 2) based on the scope ID. In some instances, the appropriate authentication mode can be chosen based on additional parameters such as, for example, an identifier associated with the resource module 156 that can either be derived from the scope ID or can be part of the request signal sent from the application 114 to the authorization module 140 (step 210). In some instances, the authentication mode or authorization mode database can be located in the memory 132 of the authorization server 130. In other instances, the authentication mode or authorization mode database can be located in the memory of another server or device that is operably coupled to the authorization server 130. The resource module 156 identifier can include, for example, the internet protocol (IP) address and/or the media access control (MAC) address of the resource server 150.

At 214, the authorization module sends a signal to the device 110 requesting user credentials. The device 110 uses a user interface to obtain user credentials from a user of the device 110. The user can be, for example, any employee of an enterprise or an individual user. Such a user credential request signal can, for example, redirect the application or a browser within the operating system of the device 110 to an OAuth authorization server login page where the user of the device 110 can enter the user credential information required for authentication of the user. At 216, the device 110 provides user credentials to the authorization module 140. The user credentials can include, for example, at least one of a user name, a password, an answer to a knowledge-based question, a short message service (SMS) code, a telephonic communication, an internet protocol (IP) address, a time of day, a Single Sign-On (SSO) assertion such as a Security Assertion Markup Language (SAML) assertion, and/or the like.

The authorization module 140 receives the user credentials from the device 110 and authenticates the user, at 218 as described above. Upon successful selection of the authentication mode, the authorization module 140 can authenticate the user of the device 110 by matching the user credential to a specific entry in a user authentication database or a look-up table stored in the memory 132 of the authorization server 130 (not shown in FIG. 2). The user authentication database can include, for example, a list of names of employees and a corresponding employment position and security/access level, social security number, employee personal identification number (PIN), employee password, an answer to a knowledge-based question, a short message service (SMS) code, a telephonic communication, an internet protocol (IP) address, a time of day, and/or the like. In other configurations, the user authentication database can be stored in the memory of another device (e.g., a server not shown in FIGS. 1 and 2) operatively coupled to the network 120. The authorization module 140 can authenticate the user of the device 110 using any suitable authentication protocol such as, for example, Secure Sockets Layer (SSL), Secure Shell (SSH), Kerberos, and/or the like.

Upon authenticating the user, the authorization module 140 can generate and/or define an access token with the appropriate scope for the application 114 on the device 110. Note that the access token can be generated at this point when the user credentials are successfully authenticated and will not be generated if the user credentials are not successfully authenticated. In some instances, the access token can include an encrypted or unencrypted form of a user personal identity number (PIN), a user security/access level, a device identification number, an internet protocol (IP) and/or media access control (MAC) address of the device 110, an application identity number, an address of the authorization module 140, and/or the like. The access token can include additional encrypted or unencrypted application credentials such as the specific features and/or resources of the application 114 that have been approved for the user (i.e., the appropriate scope of the application 114), a duration for which the access token is valid, and/or the like. In some instances, the access token can be, for example, an Open Authorization (OAuth) access token, an OpenID Connect token, a SecurID token, and/or the like. Upon generating the access token with the appropriate scope, the authorization module 140 can send the access token with the appropriate scope to the application 114 via the network 120, at 220.

The application 114 can send the access token (with the appropriate scope) to the resource module 156 via the network, at 222. The resource module 156 can receive via the network 120, the access token from the application 114, and can assess the validity of and/or verify the attributes of the access token. In some configurations, the resource module 156 can perform this verification by querying a database or a look-up table stored in the memory 152 of the resource server 150 for an entry that corresponds to the access token. In other configurations, the database or look-up table can be stored in the memory of a different server operatively coupled to the network 120. For example, the resource module 156 can acknowledge if an access token for an application 114 for an authenticated user of the device 110 has been received. In another example, the resource module 156 can acknowledge if the approved functionalities (or scope) of the application 114 for the user of the device 110 have been included in the access token. In yet another example, the resource module 156 can acknowledge if the time stamp on the access token is valid, and/or the like. In some embodiments, as part of the access token verification process, the resource module 156 can also receive information about the specific authentication modes by which the user was authenticated during the access token issuance process. The resource module 156, or a separate authorization module (not shown in FIG. 2), can then use the information about authentication modes used at the time of issuance of the access token in making an authorization decision with respect to the client's request.

Upon successfully receiving and verifying the access token, the resource module 156 can, at 224, send application data via the network 120 to the application 114 in a data package (e.g., a JavaScript Object Notation (JSON) package) for use during execution of the application 114 on the device 110. For example, if the application 114 is a sales application, the application data can include a representation of the price of a unit of a product, the number of units sold in a month, the number of units in pending orders, the revenue generated from all sales in a month, the profits earned in a month, and/or the like. In some instances, the application 114 can use the application data to populate a table for display to the user. In another example, if the application 114 is a human resource (HR) application, the application data can include a user employee number, a user social security number, an employee status code, an enterprise code for paid time off (PTO), and/or the like. In this example, the application 114 can allow the user to use this data to calculate the total number of hours worked that can be charged to the enterprise in a pay cycle, and/or the like.

In some instances, the authorization module 140 can send refresh tokens (with the appropriate scope) to the application 114 in addition to access tokens. Such refresh tokens are typically longer lasting than access tokens and can be used by the application 114 to obtain additional access tokens from the authorization server 140. Such instances can occur, for example, when access tokens expire and the application 114 and/or the user of the device 110 goes through the login phase again. In other instances, the refresh tokens (with the appropriate scope) can be generated by the authorization module 140 pro-actively, for example, when the access token has a short time-to-live and the application 114 uses a longer time-to-live. The increase in the time-to-live can be provided by, for example, the refresh tokens. As described above, upon successful authentication, the authorization module 140 can send the access token and/or refresh token with the appropriate scope to the application 114.

The access token issuing system described in FIGS. 1 and 2 includes the concept of an (OAuth) authorization server 130 (via the authorization module 140) deciding in real time (or substantially in real time, given processing delays) based on previously configured policy on how to authenticate a user of a device 110 based on the scope ID provided by the application 114 in the authorization request. The user authentication modes (or user-authorization modes) involving scope IDs corresponding to application data with higher sensitivity can typically lead to a more rigorous user authentication (or authorization).

Figure 3:
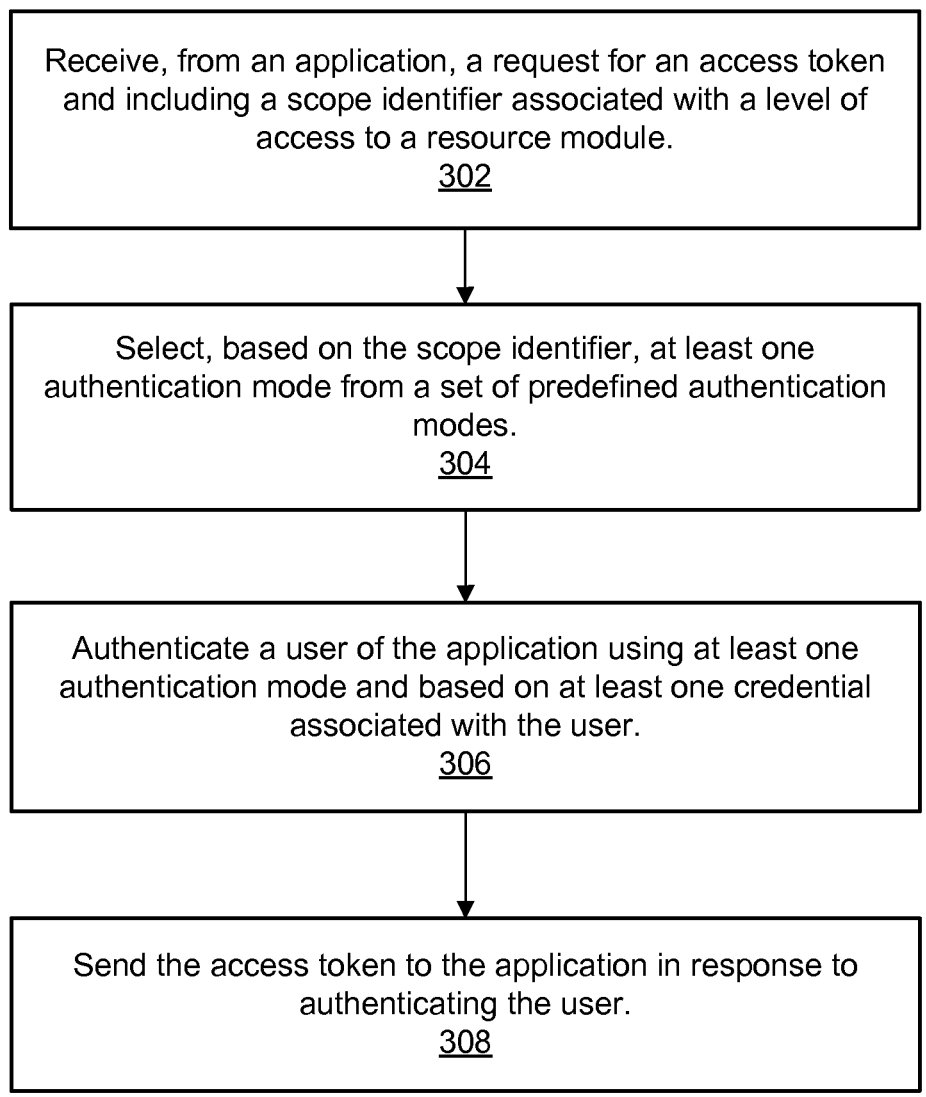
FIG. 3 is a flow chart illustrating a method for issuing an access token with the appropriate scope for an application, according to an embodiment.

FIG. 3 is a flow chart illustrating a method for issuing an access token with the appropriate scope for an application, according to an embodiment. The method 300 includes receiving at, for example, an authorization module a request for an access token and including a scope identifier associated with a level of access to a resource module, at 302. The request signal is sent from an application installed on a mobile computing or communication device. As described above, the scope identifier is associated with a level of access to a resource module (located in a resource server) requested by the application. A scope is a representation of resource. Because different resources can have different sensitivities and risk—their corresponding scopes will indirectly identify those different sensitivities. The scope identifier can be, for example, a string of arbitrary random or pseudo-random numbers generated by the application that are indicative of the resources requested by the application. The scope identifier is representative of the scope of the application that will be used by the user.

At 304, at least one authentication mode is selected from a set of predefined authentication modes based on the scope identifier by, for example, the authorization module. As described above, the authorization module can select an entry associated with at least one authentication mode from an authorization mode database based on the scope identifier and an identifier associated with the resource module. The identifier associated with the resource module can be for example, a MAC address, an IP address, and/or the like. In some configurations, the authorization mode database can be located in the memory of the authorization server. In other configurations, the authorization mode database can be located in the memory of another device (e.g., a server) operatively coupled to the authorization module via the network.

At 306, the user of the application is authenticated by, for example, the authorization module, using at least one authentication mode based on at least one user credential associated with the user. As described above, the user credential provided by the user to the authorization module can include, for example, at least one of a user name, a password, an answer to a knowledge-based question, a short message service (SMS) code, a telephonic communication, an internet protocol (IP) address, a time of day, a SAML SSO Assertion, and/or the like. In some instances, the authorization module can authenticate the user by matching the user credential to a specific entry in a user authentication database or a look-up table stored in the memory of the authorization server. The user authentication database can include, for example, a list of names of employees and their corresponding employment positions and security/access level, social security numbers, employee personal identification numbers (PIN), employee passwords, an answer to a knowledge-based question, a short message service (SMS) code, a telephonic communication, an internet protocol (IP) address, a time of day, and/or the like. In other instances, the user authentication database can be stored in the memory of another device (e.g., a server) operatively coupled to the authorization module via the network. As described above, the authorization module 140 can authenticate the user using any suitable authentication protocol such as, for example, Secure Sockets Layer (SSL), Secure Shell (SSH), Kerberos, and/or the like.

At 308, the access token is sent to the application in response to authenticating the user by, for example, the authorization module. Upon successfully authenticating the user, the authorization module can generate and/or define an access token with the appropriate scope for the application installed on the device. Note that the access token will not be generated if the user is not successfully authenticated. As described above, in some instances, the access token can include an encrypted or unencrypted form of a user personal identity number (PIN), a user security/access level, a device identification number, an IP and/or MAC address of the device, an application identity number, an address of the authorization module 140, and/or the like. The access token can include additional encrypted or unencrypted application credentials such as the specific features and/or resources of the application that has been approved for the user of the device (i.e., the appropriate scope of the application), a duration for which the access token is valid, and/or the like. In some instances, the access token can be, for example, an Open Authorization (OAuth) access token, an OpenID Connect token, a SecurID token, and/or the like. Upon generating the access token with the appropriate scope, the authorization module 140 can send the access token with the appropriate scope to the application via the network.

If the application uses the access token to request resources (or application data) that are included in the allowed scope (via the scope ID) and the corresponding authentication mode used at time of access token issuance matches the policy requirements of the resource module, the request is granted and the resource module sends the requested application data to the application. If the application uses the access token to request for resources (or application data) not included in or permitted by the allowed scope (via the scope ID), the request is denied by the resource module and no application data is sent by the resource module to the application. Hence, the application token with the appropriate scope ID can implement a high level of security to a network where users not authenticated on a device are denied from receiving application data. Additionally, the access token issuing system also allows an authenticated user of a device only the data approved for the user of the device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, in some instances, the application can include the user credentials along with the scope ID in the access token request signal sent to the authorization module. In such instances, step 218 can be performed concurrently with step 210 in FIG. 2 and step 214 and 216 can be avoided.

What is claimed is:

1. An apparatus, comprising:
an authorization module implemented in at least one of a memory or a processing device, the authorization module configured to receive, from an application, a request for an access token associated with the application, the request including a scope identifier from a plurality of scope identifiers associated with the application,
the authorization module configured to select, based on the scope identifier, a first authentication mode from a plurality of predefined authentication modes when the scope identifier is associated with a first level of access to a resource module, the authorization module configured to select the first authentication mode and a second authentication mode from the plurality of predefined authentication modes when the scope identifier is associated with a second level of access to the resource module, the authorization module configured to receive at least one credential assigned to at least one of the first authentication mode or the second authentication mode, the authorization module configured to send the access token to the application in response to authenticating a user of the application based on the at least one credential.

2. The apparatus of claim 1, wherein the access token is an Open Authorization (OAuth) access token.

3. The apparatus of claim 1, wherein the at least one credential includes at least one of a user name, a password, an answer to a knowledge-based question, a short message service (SMS) code, a telephonic communication, an internet protocol (IP) address, or a time of day.

4. The apparatus of claim 1, wherein the authorization module is configured to send the access token to the application such that the application provides the access token to the resource module.

5. The apparatus of claim 1, wherein the application is a native mobile application on a mobile device.

6. The apparatus of claim 1, wherein the authorization module is implemented at a device different than a device implementing the resource module.

7. The apparatus of claim 1, wherein the authorization module is configured to select the first authentication mode by selecting an entry associated with the first authentication mode from an authorization mode database based on the scope identifier and an identifier associated with the resource module when the scope identifier is associated with the first level of access.

8. The apparatus of claim 1, wherein each scope identifier from the plurality of scope identifiers is associated with a different predetermined authentication mode from the plurality of predefined authentication modes.

9. An apparatus, comprising:
an application implemented in at least one of a memory or a processing device, the application configured to send, to an authorization module, a request (1) for an access token associated with the application and (2) including a scope identifier from a plurality of scope identifiers associated with the application, such that the authorization module selects, based on the scope identifier, (1) a first authentication mode from a plurality of predefined authentication modes when the scope identifier is associated with a first level of access to a resource module or (2) the first authentication mode and a second authentication mode from the plurality of predefined authentication modes when the scope identifier is associated with a second level of access to the resource module;
the application configured to receive, from the authorization module, the access token in response to the authorization module authenticating a user of the application using at least one of the first authentication mode or the second authentication mode, the application is configured to send the access token to the resource module such that the resource module verifies the access token.

10. The apparatus of claim 9, wherein the access token is an Open Authorization (OAuth) access token.

11. The apparatus of claim 9, wherein the application is a native mobile application on a mobile device.

12. The apparatus of claim 9, wherein the application is configured to receive data associated with the application in response to the resource module verifying the access token.

13. The apparatus of claim 9, wherein the first authentication mode is associated with at least one of a user name, a password, an answer to a knowledge-based question, a short message service (SMS) code, a telephonic communication, an internet protocol (IP) address, or a time of day.

14. A non-transitory processor-readable medium storing code representing instructions to be executed by a processor, the code comprising code to cause the processor to:
receive, from an application, a request for an access token, the request including a scope identifier from a plurality of scope identifiers associated with the application;
select, based on the scope identifier, (1) a first authentication mode from a plurality of predefined authentication modes when the scope identifier is associated with a first level of access to a resource module or (2) the first authentication mode and a second authentication mode from the plurality of predefined authentication modes when the scope identifier is associated with a second level of access to the resource module;
authenticate a user of the application (1) using at least one of the first authentication mode or the second authentication mode and (2) based on at least one credential associated with the user; and
send the access token to the application in response to authenticating the user.

15. The non-transitory processor-readable medium of claim 14, further comprising code to cause the processor to:

provide, to a user device, a request for the at least one credential; and receive, from the user device, the at least one credential.

16. The non-transitory processor-readable medium of claim 14, wherein the access token is an Open Authorization (OAuth) access token.

17. The non-transitory processor-readable medium of claim 14, wherein the application is a native mobile application on a mobile device.

18. The non-transitory processor-readable medium of claim 14, wherein the at least one credential includes at least one of a user name, a password, an answer to a knowledge-based question, a short message service (SMS) code, a telephonic communication, an internet protocol (IP) address, or a time of day.

19. The non-transitory processor-readable medium of claim 14, wherein the code to cause the processor to send includes code to cause the processor to send the access token to the application such that the application provides the access token to the resource module.

20. The non-transitory processor-readable medium of claim 14, wherein the code to cause the processor to select includes code to cause the processor to select the first authentication mode by selecting an entry associated with the first authentication mode from an authorization mode database based on the scope identifier and an identifier associated with the resource module when the scope identifier is associated with the first level of access.

* * * * *